March 6, 1973  J. R. THURSTON  3,719,146
AERIAL FLARE WITH DROGUE PARACHUTE
Filed June 11, 1971  2 Sheets-Sheet 1

INVENTOR.
James R. Thurston
BY Edward E. McCullough
AGENT

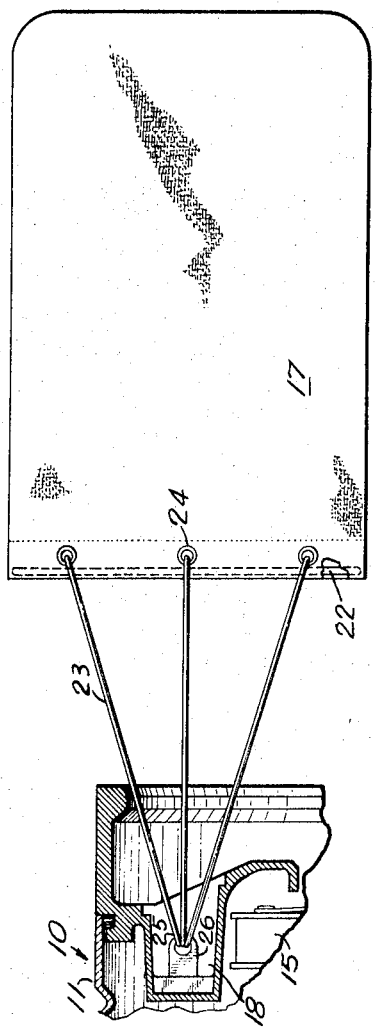
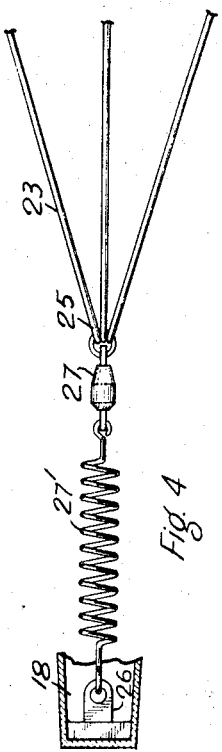
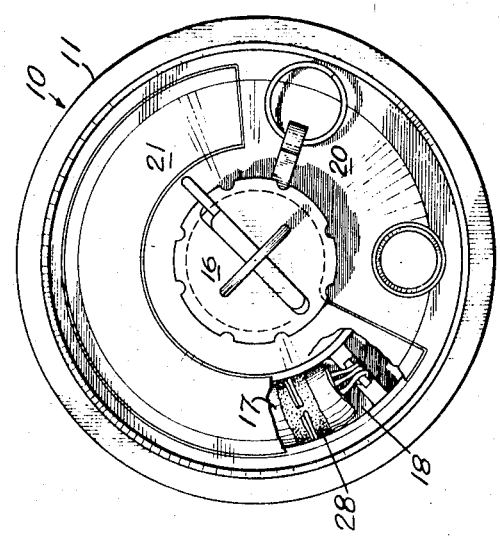

United States Patent Office 3,719,146
Patented Mar. 6, 1973

3,719,146
AERIAL FLARE WITH DROGUE PARACHUTE
James R. Thurston, Brigham City, Utah, assignor to Thiokol Chemical Corporation, Bristol, Pa.
Filed June 11, 1971, Ser. No. 152,204
Int. Cl. F42b 25/04
U.S. Cl. 102—35.6                                    7 Claims

ABSTRACT OF THE DISCLOSURE

A specially designed drogue parachute is attached to the housing of an aerial flare to inhibit spinning, which otherwise impairs functioning of timing mechanisms when such flares are deployed with extensive free falls, as from high altitudes. The open end of the sack-like parachute has a reinforcing ring that also functions as a spring to open the parachute when it is deployed.

CROSS REFERENCE TO RELATED APPLICATIONS

This invention is related to a patent application, Ser. No. 787,096, filed Dec. 26, 1968, titled "Aerial Flare and Parachute Deployment Means Therefor" by W. F. Davis et al., and owned by the same assignee of the entire rights, now abandoned.

BACKGROUND OF THE INVENTION

This invention relates to aerial flares, and more specifically to apparatus and means for inhibiting excessive spin when such flares are deployed with extensive free falls from aircraft. The invention herein described was made in the course and/or under a contract with the U.S. Air Force.

The basic flare, as described in the cited, related patent application, has a cylindrical housing, an illuminant composition, and an igniter fastened to a parachute so that when the parachute opens, the flare is ignited. A spring-driven timer is manually set by a knob that is removed from the flare by a lanyard attached to the airplane when the flare is dropped. The timer releases a parachute after the predetermined interval, simultaneously igniting the flare.

Although this flare was satisfactory when deployed with short timer settings as from low altitude aircraft, when it was dropped with timer settings greater than 15 seconds as from high altitude aircraft, the extended free fall through the atmosphere caused the flare to spin rapidly in a manner similar to the action of an airplane propeller. This spin has been observed to be as great as 760 r.p.m., impressing very high centrifugal loads on the parts of the mechanical timer, which is located in one end of the flare. Tests indicated that action of the timer was either greatly slowed or stopped entirely, so that the parachute was never released and the flare never ignited.

SUMMARY OF THE INVENTION

The present invention was devised to overcome this problem in deploying flares from high altitude aircraft. It is essentially a specially designed drogue parachute that is capable of being stored in a compartment in one end of the flare so that it will be freed by the removal of the timer knob but cannot emerge from its compartment until unacceptable centrifugal force is impressed on it. This drogue parachute has the general form of a sack, reinforced at its opening by a resilient ring that also functions to open the parachute when it is freed. Shroud lines extend from the sack to the flare. A tension spring and/or swivel may optionally be included between the shroud lines and the flare.

Objects of the invention are to inhibit excessive spin of a flare, and thereby to permit normal functioning of the mechanical timer of the flare regardless of the free fall distance before the parachute is released. Important features of the invention are that it is uncomplicated in structure, highly reliable, and requires no mechanical moving parts in addition to those already incorporated in the flare.

These and other objects and advantages of the invention will be noted as the following description is read with reference to the accompanying drawings, wherein the same parts are designated by identical characters throughout the disclosure.

BRIEF DESCRIPTION OF THE DRAWINGS

FIG. 2 is an end view with some parts broken away to show how the parachute is stored;

FIG. 3 is a fragmentary end section of the flare showing the drogue parachute in its deployed position; and FIG. 4 is a fragmentary section showing how the drogue parachute may be attached to the flare via a swivel and spring.

DESCRIPTION OF THE PREFERRED EMBODIMENTS

Figure 1:
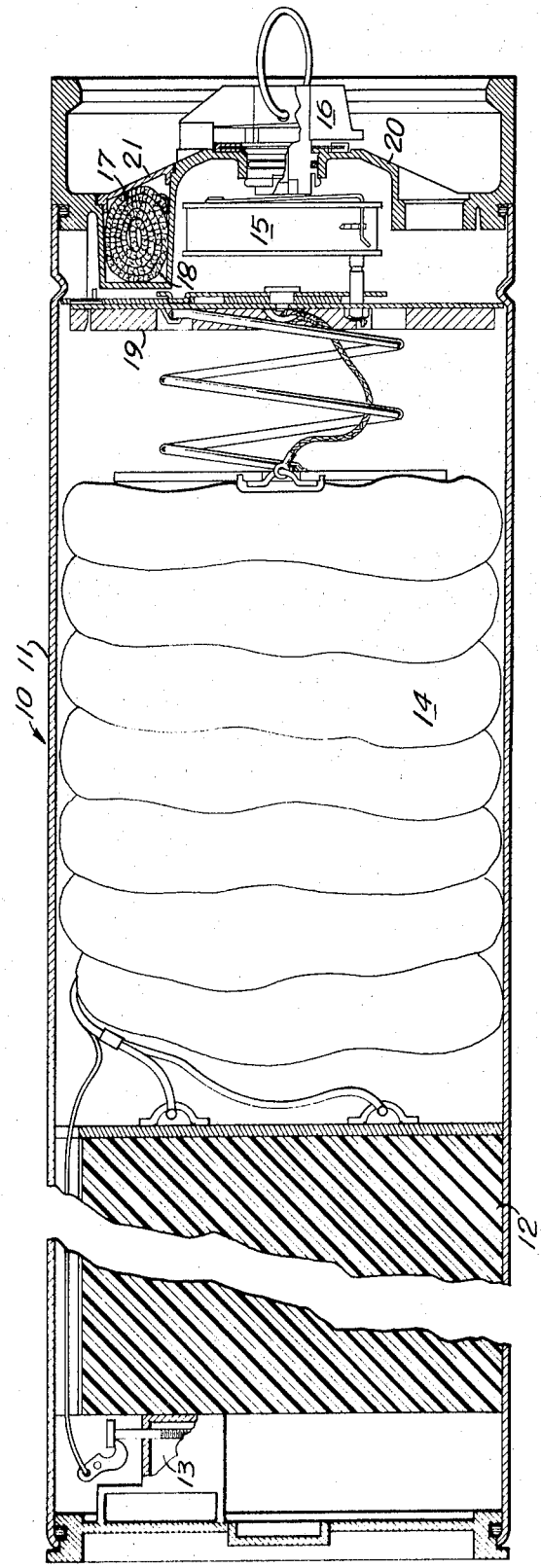
FIG. 1 is a longitudinal section of the entire flare, showing the drogue parachute installed therein.

The basic flare 10, in which this invention is useful, is fully described in the patent application cited above. It essentially comprises a tubular case 11, an illuminant composition 12 within the case 11, an igniter 13 for igniting the illuminant, a main parachute or slow descent means 14, and a mechanical timer 15. The timer 15 is manually set by a knob 16, which is attached to the airplane or launcher by a lanyard, not shown, so that the knob is removed from the flare when the flare is dropped from the airplane. By mechanisms described in the cited related application, the timer 15 releases the main parachute 14 after a predetermined length of time. The parachute 14 is attached to the igniter 13 so that, when the parachute 14 is released, it triggers the igniter 13 to ignite the illuminant composition 12.

The essential feature of the present invention is a drogue parachute 17 that is stored in a special compartment 18 adjacent the timer 15 between the main parachute release mechanism 19 and the end cap 20 of the flare 10. The storage compartment 18 is arcuate in cross section about the knob 16. The portion 21 of the end cap that covers the storage compartment 18 has the same arcuate form and is attached to the knob 16 so that, when the knob 16 is removed from the flare 10, this portion 21 of the end cap 20 is also removed to expose the drogue parachute 17. Centrifugal force on the drogue parachute 17 caused by the rapidly spinning flare will pull this parachute out of its compartment 18.

In the preferred embodiment shown, the drogue parachute 17 has the general form of a sack, reinforced at the opening by a resilient ring 22. The ring 22 in this embodiment is a steel cable over which the material of the parachute 17 is folded upon itself and fastened by sewing. Although any of a number of thin, flexible materials may be used for this parachute, the preferred material shown is of calendered nylon fibers. Shroud lines 23, also of nylon, are each fastened at one end to the resilient ring 22 through eyelets 24 in the parachute 17. The opposite ends 25 of the shroud lines 23 may be fastened directly to the lug 26 in the compartment 18. Alternatively, the swivel 27 may be fastened between the ends 25 of the shroud lines 23 and the lug 26 to prevent twisting of the shroud lines, which could cause the parachute to collapse if such twisting is severe enough. A tension spring 27' may also optionally be placed between the ends 25 of the shroud lines 23 and the lug 26. This spring 27' can absorb the shock that would be produced on deployment of the drogue parachute 17 from high speed aircraft which could otherwise damage the parachute 17.

When stored in the compartment 18, the drogue parachute 17 is rolled from its outer end to the opening thereof and bent into an arcuate form to fit into the compartment 18. Two bands 28 of friction material, such as emery cloth, are placed around the rolled parachute 17 before it is placed in the compartment 18. These bands of friction material 28 prevent escape of the parachute 17 from its compartment 18 until a predetermined amount of centrifugal force pulls it out. Hence, the parachute 17 is not automatically deployed whenever the flare 10 is dropped, but only when it is actually needed to inhibit a spin that is great enough to interfere with the functioning of the timer 15.

An invention has been described that constitutes an advance in the art of flares that are deployable from high altitude aircraft. Although the embodiments have been described in rather specific detail, it should be noted that such details may be altered without departing from the scope of the invention as defined in the following claims.

The invention claimed is:

1. In an aerial flare having a housing including a tubular case, an illuminant composition therein, a slow-descent means attached to the case, deployment means for the slow descent means and attached thereto, a timer operatively connected to the deployment means, initiating means on the timer for starting it, an igniter adjacent the illuminant, and trigger means for the igniter, operatively attached to the slow descent means for igniting the illuminant when the slow-descent means operates, the improvement comprising:

a drogue parachute attached to the housing by shroud lines, and being normally stored in a compartment in the housing; and friction means to retain the drogue parachute in the compartment until a centrifugal force caused by rotation of the launched flare becomes great enough to overcome the friction means and pull the drogue parachute free of the compartment.

2. The flare of claim 1 wherein the friction means is a band of emery cloth wrapped around the stored drogue parachute so that emery thereof engages the compartment walls.

3. The flare of claim 1 including a swivel between the shroud lines and their attachment to the housing, so that the drogue parachute may rotate freely without twisting the shroud lines.

4. The flare of claim 1 including a tension spring between the shroud lines and their attachment to the housing, for absorbing shock in high speed deployment of the drogue parachute.

5. A drogue parachute for attachment to illuminating flares comprising:

a thin, flexible sack;

a resilient reinforcing ring attached into the opening of the sack for reinforcement thereof and for insuring that the sack will open when deployed;

shroud lines each attached at one end to the reinforcing ring; and attachment means fixed to the flare and connected to the free ends of the shroud lines for attaching the drogue parachute to a flare.

6. The drogue parachute of claim 5 including a swivel between the attachment means and the shroud lines, so that the sack may rotate freely without twisting the shroud lines.

7. The drogue parachute of claim 5 including a tension spring between the attachment means and the shroud lines, for absorbing shock in high speed deployment of the drogue parachute.

References Cited
UNITED STATES PATENTS

| | | | |
|---|---|---|---|
| 2,112,614 | 3/1938 | Wiley | 102—35 |
| 1,621,421 | 3/1927 | Konzer | 102—35.6 |
| 2,452,990 | 11/1948 | Bush | 244—138 R |
| 1,238,904 | 5/1919 | Folmer | 102—35 |

ROBERT F. STAHL, Primary Examiner

U.S. Cl. X.R.

102—37.6; 244—137